May 23, 1950     C. E. TACK     2,509,176
BRAKE HANGER
Filed Feb. 27, 1947     2 Sheets-Sheet 1
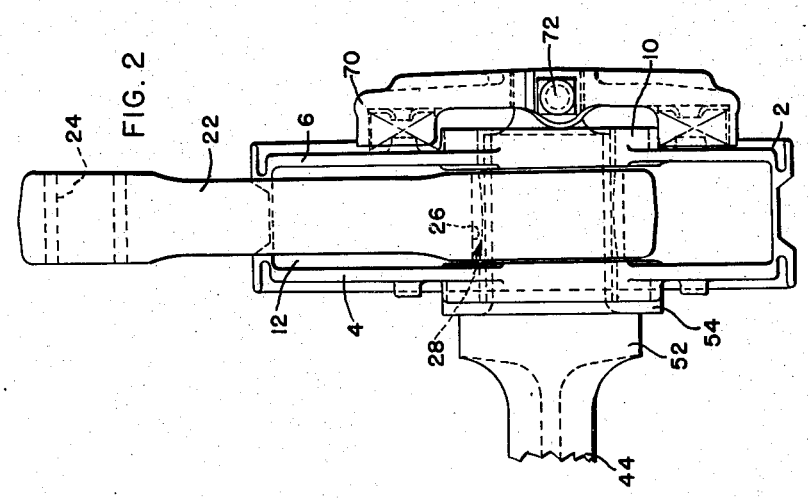
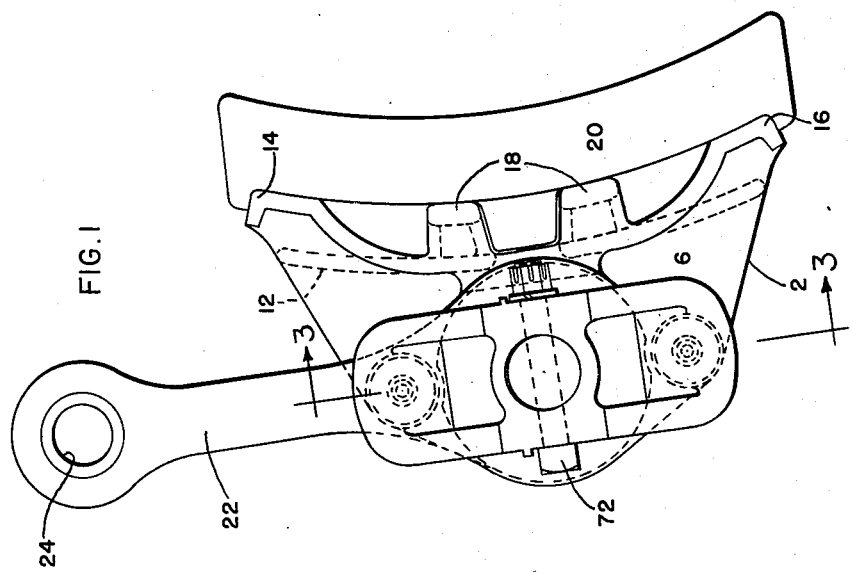
INVENTOR
CARL E. TACK
BY
ATTORNEY May 23, 1950
C. E. TACK
2,509,176
BRAKE HANGER
Filed Feb. 27, 1947
2 Sheets-Sheet 2
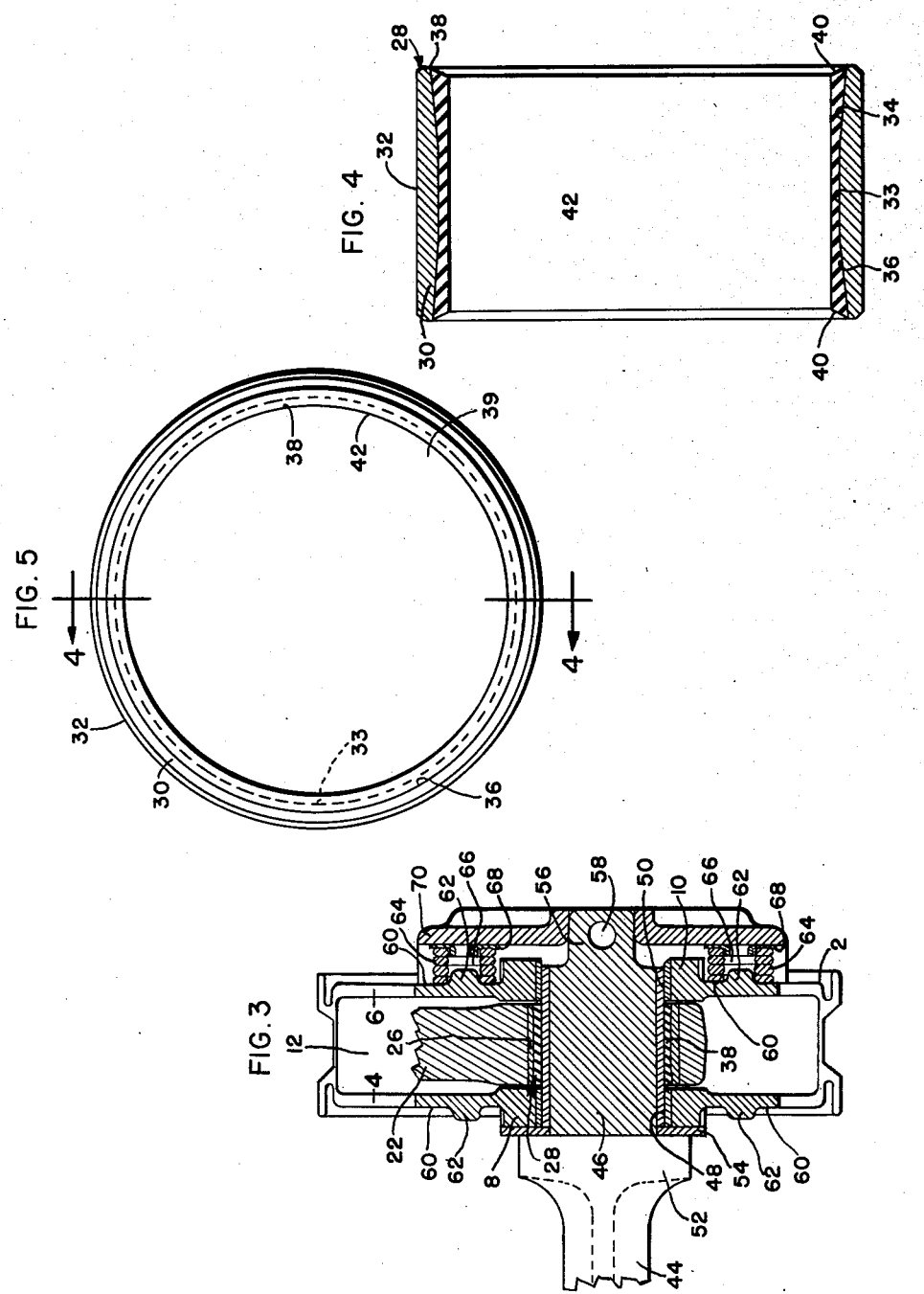
INVENTOR
CARL E. TACK
BY
ATTORNEY Patented May 23, 1950

2,509,176

UNITED STATES PATENT OFFICE 2,509,176

BRAKE HANGER

Carl E. Tack, Chicago, Ill., assignor to American Steel Foundries, Chicago, Ill., a corporation of New Jersey Application February 27, 1947, Serial No. 731,339

3 Claims. (Cl. 188—207)

My invention relates to railway brake equipment and has particular reference to the connection between a brake beam and its supporting hanger.

It is a well known fact that in railway equipment all parts are subjected to severe vibrations and this is particularly true of the brake rigging of a car truck and especially of such parts thereof as brake beams and their supporting hangers. The connection between the hangers and the brake beam has heretofore of necessity been relatively loose due to manufacturing tolerance allowances which are usual in the trade. To make exacting fits would entail prohibitive costs and furthermore would be impracticable since even though these parts were made to fit snugly initially the connection would become loose upon wear. The loose connection between the brake beam and its supporting hangers permits the former to swing freely transversely of the car truck during operation of the same in service resulting in acceleration of wear between the hangers and brake beam at their points of connection. Excess free play between these parts permits the brake beam to swing violently and with sufficient momentum to break the hangers.

It is the object of my invention to devise a simple, inexpensive bushing arrangement such as will provide a close fitting connection between a brake beam and its associated hangers, and also contemplates such a bushing arrangement as will permit of relatively simple application of the said hangers to the beam.

Another object of my invention is to devise an arrangement of a hanger for supporting a brake beam which will eliminate all wear on the brake beam and hanger at their points of connection.

A further object of my invention is to provide a novel connection between a brake beam and its associated hangers in which resilient means are utilized between the hangers and the brake beam to afford a tight connection between the same and functioning to restrain free swinging movement of the hanger and the beam while permitting the necessary lateral movement of the beam and lateral angling of the hanger.

My invention comprehends an arrangement in which the brake hanger is provided with a metallic bushing member internally carrying resilient means such as rubber, said resilient means being compressed between the said bushing member and a brake beam extending through said member, said resilient means being placed in shear during relative torsional movement of the hanger and brake beam upon actuation of said hanger by the brake beam under brake application to facilitate return of the hanger and beam to their normal positions upon release of the brakes.

These and various other objects of my invention will be apparent from the following description and the accompanying drawings, and will be particularly pointed out in the claims.

In the drawings, Figure 1 is a side elevation of a brake arrangement embodying my invention.

Figure 2 is a rear elevation, taken from the left, as seen in Figure 1, the brake beam, however, being fragmentarily shown.

Figure 3 is a sectional view taken in the plane represented by line 3—3 of Figure 1 with the brake hanger and brake beam being fragmentarily shown.

Figure 4 is a sectional view of the hanger bushing, the view being taken in the transverse vertical plane substantially as indicated by line 4—4 of Figure 5, and Figure 5 is an end elevation of the bushing shown in Figure 4.

Describing the illustrated embodiment of my invention in detail, the brake head generally designated 2 comprises spaced inboard and outboard walls 4 and 6 provided with parallel bearing portions 8 and 10 respectively, said inboard and outboard walls having a transverse wall 12 extending therebetween and merging therewith. The transverse wall also merges with spaced end or toe lugs 14 and 16, as well as intermediate lugs 18, 18, said lugs being formed and arranged for connection to a brake shoe 20 in the conventional manner.

The brake hanger or support member, generally designated 22, is provided at its upper end with a bushed opening 24 (Figures 1 and 2) affording a pivotal connection to a supporting frame member (not shown). The opposite end of the brake hanger extends between the brake head walls 4 and 6 and is provided with an annular opening 26 (Figures 2 and 3) into which is press-fitted a complementary bushing 28.

The bushing 28 is shown in detail in Figures 4 and 5 and comprises a cylindrical metallic member 30 preferably formed of steel which, as hereinbefore described, is press-fitted into the opening 26 in the lower end of the hanger 22. The outer surface 32 of the bushing 28, as will be seen from considering Figures 4 and 5, is cylindrical in form and is of constant radius from end to end. The inner surface of the member 30 comprises a cylindrical center portion or surface 33 of constant curvature and also has outwardly flaring, tapering or frusto-conical end portions comprising the surfaces 34 and 36, each surface 34 and 36 extending from one edge of the said center portion 33 to the adjacent edges of the member 30.

To the inner surface of the member 30 is secured as by vulcanizing a relatively thin layer of resilient material lining or bearing 38, said lining being chamfered at the opposite edges thereof as at 40, 40 (Figure 4) for a purpose hereinafter described. The inner surface 42 of the lining 38 is cylindrical in form and is of constant curvature from end to end and forms an annular opening 39 (Figure 5), while the outer surface of said lining is formed to conform in contour to that of said inner surface of the member 30 and thus it will be seen that the lining is thicker as it approaches the edges of the member 30, whereas the center section of the lining is of a lesser thickness, it being noted that the center section of the lining fits against the center portion 33 of the inner surface of the member 30, and the end portions of the lining fit against the respective of said surfaces 34 and 36.

The brake beam, generally designated 44, which may be connected to suitable actuating means (not shown) in any convenient manner includes a bushed trunnion end 46 (Figure 3) extending through the bushed openings 48 and 50 in the said bearing portions 8 and 10 of the inboard and outboard walls of the brake head, said trunnion end also extending through the opening 39 formed by the lining 38, said lining bearing against the trunnion end and providing a tight pivotal connection between the brake beam and the hanger. The inboard end of the trunnion 46 terminates in a shoulder 52 on the beam to which a wear plate 54 may be secured in any desired manner as, for example, by welding, said plate being adapted for frictional engagement, as hereinafter described, with the bearing portion 8 of the brake head wall 4. It will be understood by those skilled in the art that if desired the wear plate 54 may be eliminated and the brake head may bear directly against the shoulder 52 so that the plate 54 may, for functional purposes, be regarded as part of the beam itself. Adjacent its outboard end, the beam is machined to form a portion 56 (Figure 3) of reduced diameter having an opening 58 and serving a purpose hereinafter described.

The brake head balancing device shown will be only generally described inasmuch as the same is described in detail in a copending application, Serial No. 646,456, filed in the United States Patent Office on February 8, 1946, in the names of Carl E. Tack and Wesley A. Helsten, and forms no part of this invention.

At opposite sides of each of the bearing portions 8 and 10, the brake head walls 4 and 6 are provided with spring seats 60, 60, said seats having a spring-positioning lug 62 integrally formed thereon. A pair of springs 64, 64 are seated against the seats 60, 60 on the outboard wall 6 and are positioned thereon by the associated lugs 62, 62, said springs having their opposite ends received within spring pockets 66, 66 and engaging spring seats 68, 68 (Figure 3) provided at the upper and lower ends on the spring plate generally designated 70, the said spring plate being secured on the trunnion end of the beam by means of a pin 72 passing through the opening 58 in a manner as best seen in Figure 2, the springs urging the bearing 8 on the inboard wall 4 of the brake head into frictional engagement with the wear plate 54.

In assembling the parts of the brake arrangement illustrated, the member 30 of the bushing 28 is press-fitted into the opening 26 in the hanger 22, the interior lining in the member 30 having been vulcanized in place prior to the assembly of the bushing with the hanger 22. The lower end of the hanger is inserted between the walls 4 and 6 of the brake head and the openings 48 and 50 in the bearing portions 8 and 10 of the brake head walls 4 and 6 are aligned with the opening 39 in the bushing 28. These openings are then aligned with the trunnion end 46 of the beam 44 and the end 46 is then inserted through the opening 48, and forced through the opening 39 in the bushing 28. The chamfer 40 on the edges of the lining 38 permits the trunnion end to be relatively easily inserted into the bushing 28. Further movement of the beam forces the trunnion end thereof to move through the opening 50 in the bearing portion 10 of the brake head wall 6 in which position, it will be seen upon considering Figure 3, the rubber lining has flowed out at its opposite edges and is under compression between the element 30 of the bushing 28 and the trunnion end 46, the chamfer of the edges of the resilient lining being sufficient to accommodate the flowing out of the resilient material to the edges of the steel element 30 of the bushing 28. The brake head balancing device is then applied and the whole mechanism is locked in place by inserting the pin 72 through the opening 58 in the portion 56 of the trunnion end.

It will thus be appreciated that I have devised a relatively tight connection between the hanger and the brake beam and that the connection permits some longitudinal movement of the brake beam with resultant tilting of the brake hanger in either direction depending on the movement of the brake beam. The rubber lining prevents any wear on the trunnion or the hanger since there is no metal to metal contact between them. The resilient lining also effectively constrains relative movement between the hanger and brake beam and upon occurrence of such movement serves to bring the brake beam and hanger into normal operating position.

It will also be observed that since the lining is in tight engagement with the trunnion end of the brake beam, application of the brake (which involves actuation of the power means, not shown, operatively connected to the brake beam, said power means actuating said brake beam and causing said brake beam to rotate with respect to the hanger) causes the brake beam in its rotational movement to impose shearing or torsional stresses on the resilient lining. The resilient characteristics of the material or lining, it will be observed, accommodates much of the torsional or rotational movement of the brake beam and hanger and serves to bring the brake beam and hanger to their normal "off" position upon the release of the brakes.

It will further be observed that the brake head and brake beam are bushed metal to metal and that the braking effort from the brake beam is transmitted to the brake head along complementary rigid bearing areas and that upon such application of the brake the pressure of the brake head against the brake beam does not in any way affect the compression on the resilient lining between the brake beam and the brake hanger and that, thus the deflection of the brake head relative to the brake beam is kept to the minimum.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, a brake hanger having a transverse opening, a bushing within said opening comprising a hollow metallic shell fitted tightly within said opening, said shell having an internal cylindrical surface intermediate its ends and outwardly flaring internal frusto-conical surfaces at opposite ends of said cylindrical surface, a resilient member fitted within said shell having a central cylindrical aperture and comprising a cylindrical portion intermediate its ends fitted snugly against said internal cylindrical surface of the shell, said member also having frusto-conical end portions with external surfaces flaring outwardly toward the ends of said member and each complementally fitted against the adjacent internal frusto-conical surface of said shell, and a brake beam having a trunnion extending through said aperture in a tight fit with said member.

2. In a brake arrangement, a hanger having an opening in its lower extremity and having means at its upper extremity for attachment to an associated support, a hollow metallic member fitted tightly into said opening, said member having an intermediate internal cylindrical surface and internal frusto-conical surfaces at opposite ends of said intermediate surface and flaring outwardly toward respective ends of said member, a resilient bearing within said shell having an external contour complemental to the internal contour of said member as defined by the aforesaid surfaces and seated thereagainst, a cylindrical aperture through said bearing, and a brake part having a cylindrical trunnion extending through said aperture in a tight fit with said bearing, the end portions of said bearing seating against said internal frusto-conical surfaces of the shell and being gradually thickened from their inner to their outer extremities whereby the yieldability of said bearing radially of said trunnion is greater at its ends than intermediate the same.

3. In a brake arrangement, a hanger having an opening, a bushing comprising a metallic sleeve press-fitted into said opening, said sleeve having an internal intermediate cylindrical surface and outwardly flared internal end surfaces, a resilient bearing having an outer contour complemental to the interior of said sleeve as defined by said surfaces and fixed to said surfaces and having a cylindrical aperture therethrough, a brake beam having a trunnion extending through said aperture in tight engagement with the bearing, and a brake head having spaced walls disposed at opposite sides of said hanger and pivoted to said trunnion along rigid bearing areas, said resilient bearing being chamfered at its ends to accommodate bulging of the same within the space between the bearing and the adjacent wall.

CARL E. TACK.

REFERENCES CITED

The following references are of record in the file of this patent:

UNITED STATES PATENTS

| Number | Name | Date |
|---|---|---|
| 1,541,276 | Powell | June 9, 1925 |
| 1,833,002 | Smith | Nov. 24, 1931 |
| 2,048,338 | Hume | July 21, 1936 |
| 2,150,631 | Piron | Mar. 14, 1939 |
| 2,215,523 | Hanshalter | Sept. 24, 1940 |
| 2,281,535 | Drews | Apr. 28, 1942 |
| 2,289,572 | Underwood | July 14, 1942 |